UNITED STATES PATENT OFFICE.

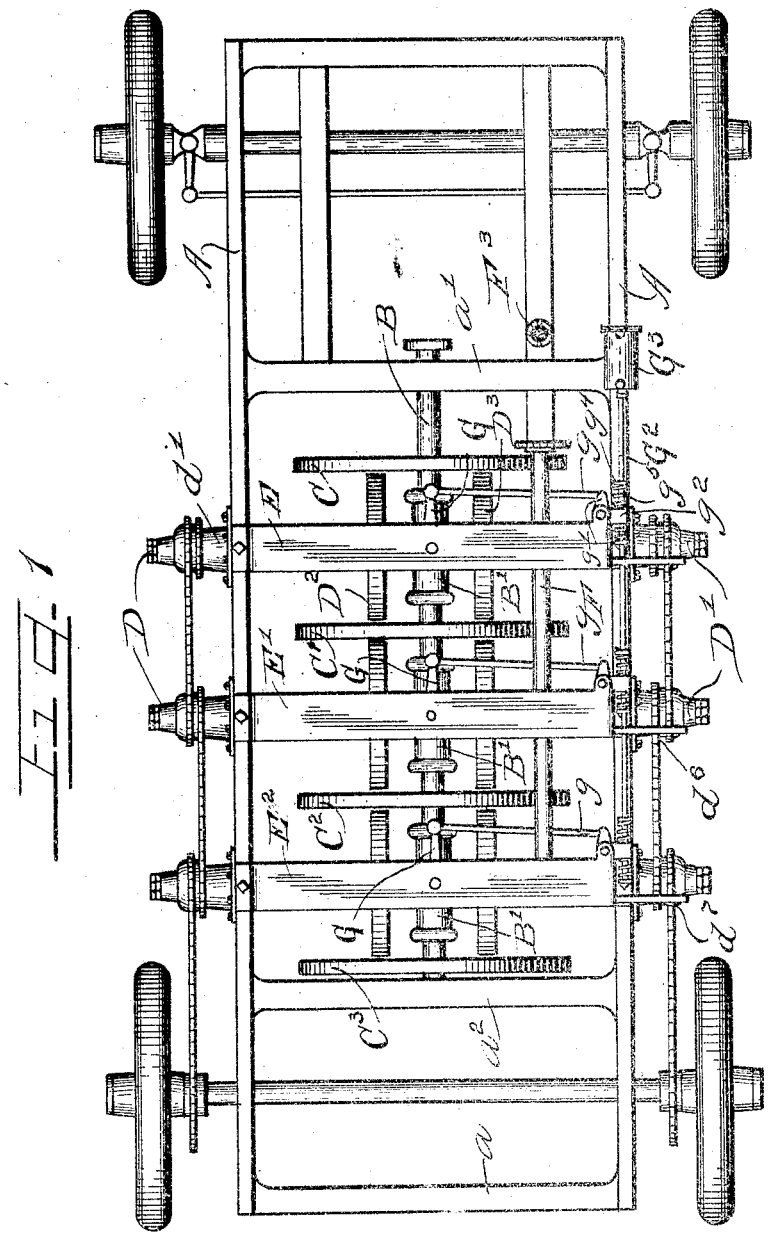

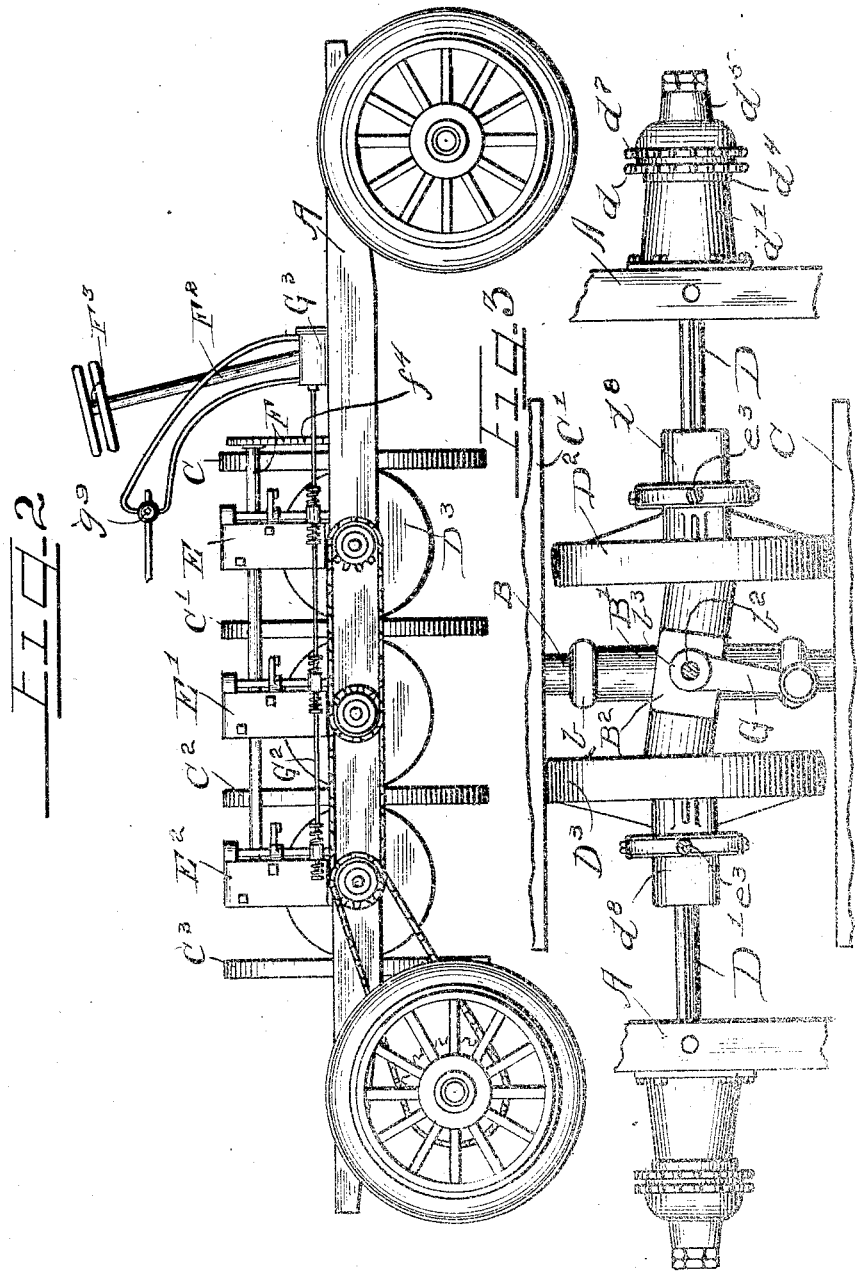

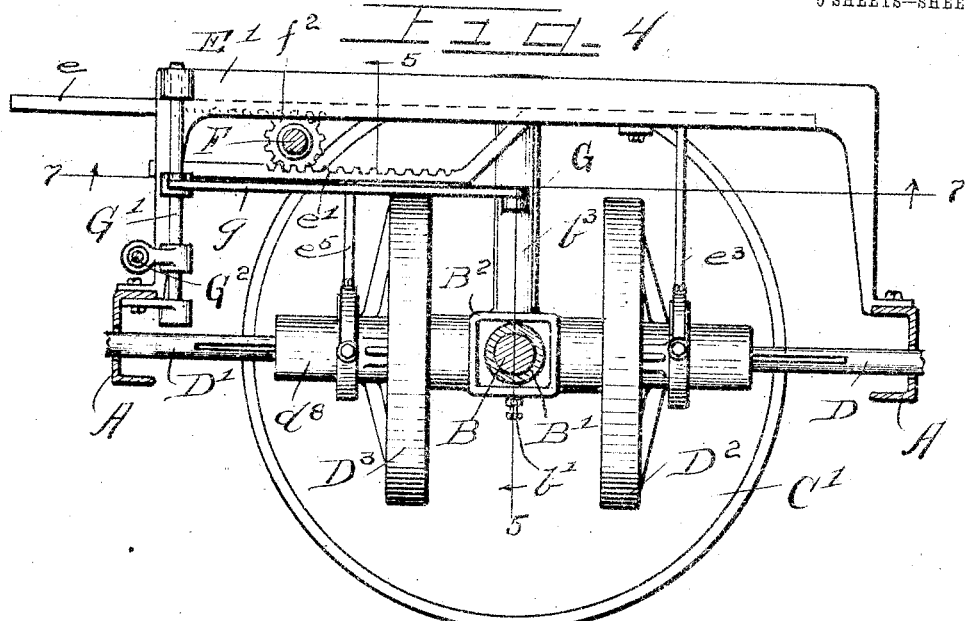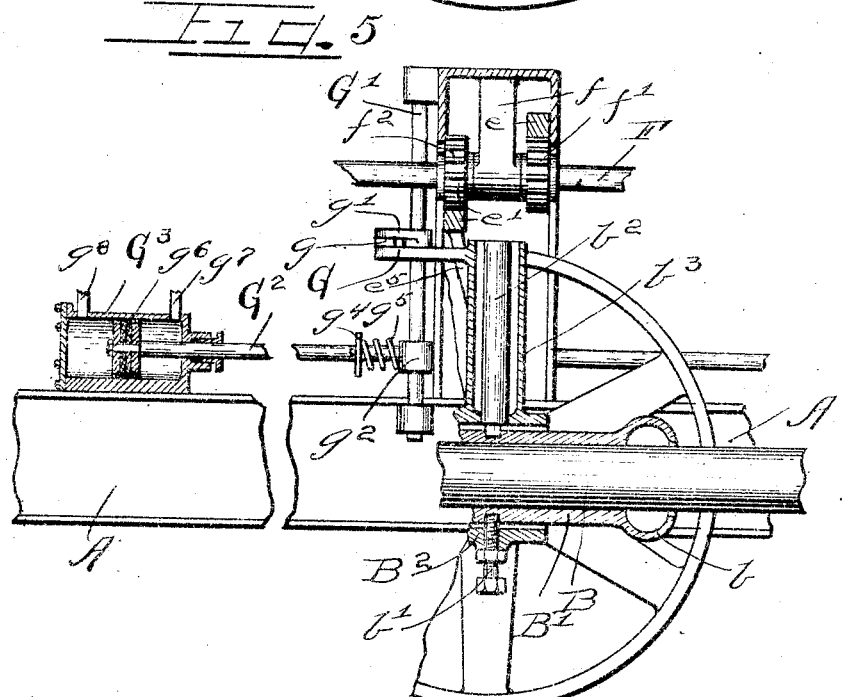

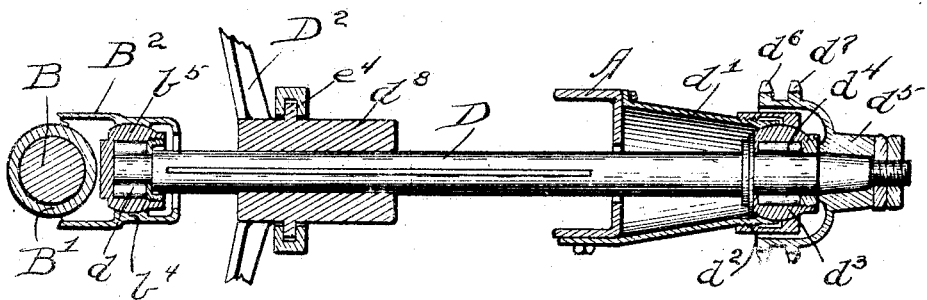
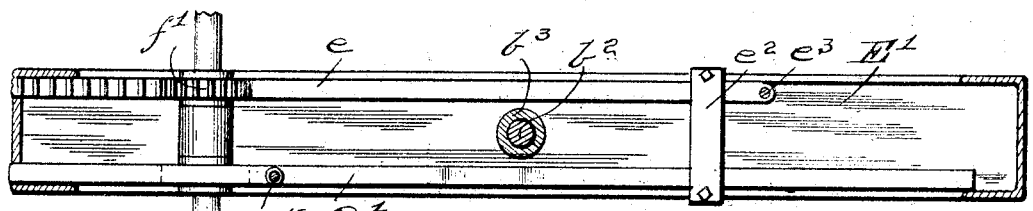
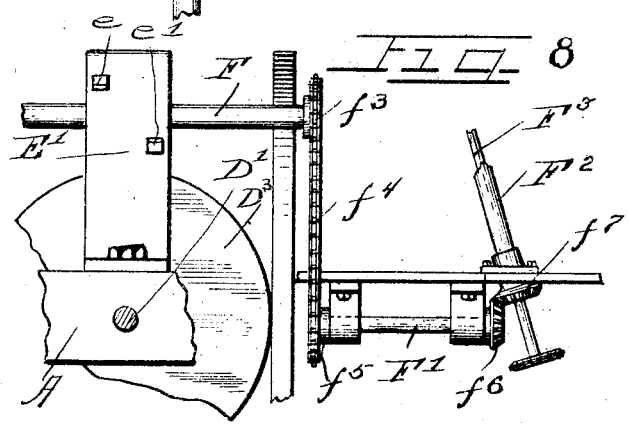
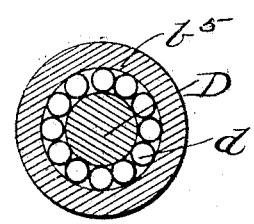

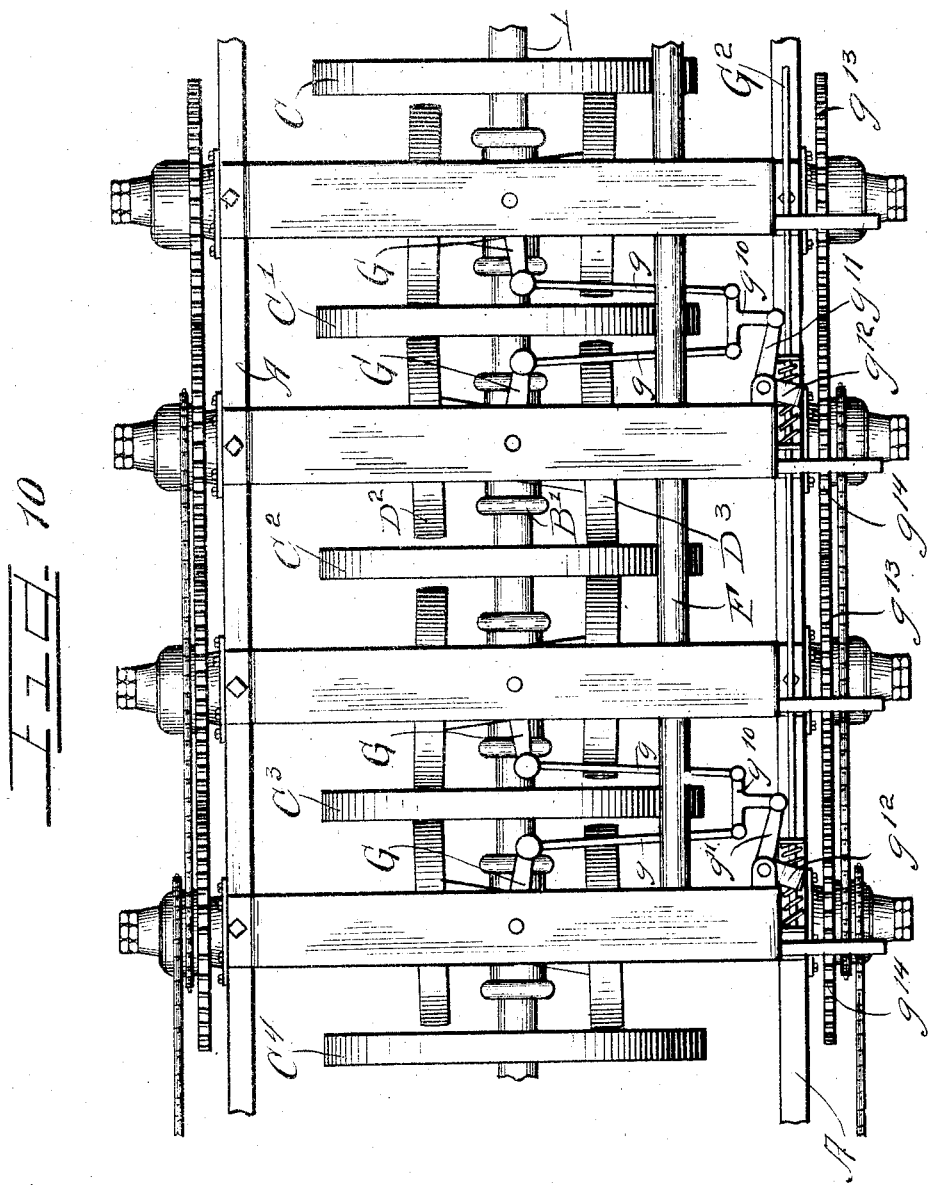

WILLIAM O. WORTH AND JOHN D. WORTH, OF CHICAGO, ILLINOIS; SAID WILLIAM O. WORTH ASSIGNOR TO ARSEMOS R. BURKDOLL.

MULTIPLE FRICTION TRANSMISSION-GEAR.

No. 906,844.      Specification of Letters Patent.      Patented Dec. 15, 1908.

Application filed March 26, 1906, Serial No. 308,003. Renewed May 11, 1908. Serial No. 432,275.

*To all whom it may concern:*

Be it known that we, WILLIAM O. WORTH and JOHN D. WORTH, citizens of the United States, and residents of the city of Chicago, county of Cook, and State of Illinois, have invented certain new and useful Improvements in Multiple Friction Transmission-Gears; and we do hereby declare that the following is a full, clear, and exact description of the same, reference being had to the accompanying drawings, and to the letters of reference marked thereon, which form a part of this specification.

This invention relates to multiple friction transmission gears and more particularly to a friction transmission gear adapted for use in automobiles, street, suburban and inspection cars and for many other purposes.

Heretofore friction transmission gears usually embraced one or a pair of driving friction wheels and considerable loss of power caused by the slipping of the friction wheels relatively. The means for shifting the mechanism to frictional engagement between the driven and the driving elements are not sufficiently positive in action to insure a sufficient pressure between the contacting faces of the friction members.

The object of this invention is to provide a transmission device of such a nature that any desired number of driving friction wheels secured upon the driving shaft may be brought into operation simultaneously upon co-acting driven or transmitting friction wheels from whence the power is communicated to be operated or propelled thereby.

It is a further object of the invention to provide a construction, at once strong, cheap, simple and durable and in which means are provided to insure positive engagement of the driven with the driving elements of the transmission mechanism and to reverse the engagement instantaneously.

The invention embraces many novel features and consists in the matters hereinafter described and more fully pointed out and defined in the appended claims.

In the drawings: Figure 1 is a top plan view of a device embodying our invention showing the same applied to an automobile chassis. Fig. 2 is a side elevation thereof. Fig. 3 is an enlarged fragmentary top plan view illustrating the adjustment of the driven friction wheels. Fig. 4 is an enlarged transverse section illustrating the radial adjustment of the driven friction wheels relatively of the driving friction wheels. Fig. 5 is a fragmentary longitudinal section. Fig. 6 is an enlarged transverse section taken longitudinally of one of the transmission shafts. Fig. 7 is a section taken on line 7—7 of Fig. 4. Fig. 8 is an enlarged fragmentary detail of a part of the steering mechanism and the means for actuating the racks. Fig. 9 is an enlarged transverse section of one of the roller bearings for one of the transmission shafts. Fig. 10 is a top plan view showing a different arrangement of the friction members.

As shown in said drawings: The mechanism is shown applied to an automobile chassis of which A—A indicate the side frame members, $a$ the end frame members and $a'$—$a^2$ are transverse beams on which is journaled the longitudinal centrally disposed driving shaft B which is coupled with any suitable engine or motor carried upon the front end of the chassis (but not shown) in any suitable or convenient manner. Rigidly secured upon said shaft are any desired number of driving friction members or wheels as shown four in number indicated by C—C'—$C^2$—$C^3$ of equal diameter and having flat friction faces on each side thereof and which are spaced equal distances apart upon the shaft, and which being rigidly secured to the driving shaft are driven continuously in the same direction when the motor is in operation.

Centrally secured on the shaft B between each pair of driving friction wheels as shown in Figs. 3 and 5, is a sleeve B' having enlarged and chambered ends $b$ which afford an oil or grease receptacle at each end thereof. Pivoted on said sleeve B' at its center is a housing $B^2$ through which said sleeve B' extends as shown in Figs. 3 and 6, and which is centered on said sleeve by means of a set screw $b'$ extending upwardly through said housing and into the sleeve at its center and by means of a pin or post $b^2$ secured therein which extends downwardly at the axis of a vertical tubular post $b^3$, integral with the housing at its center and engages through a suitable aperture in said housing in a socket oppositely disposed from said set screw. The ends of said housing are directed transversely of the shaft B and each of the same is shaped internally to afford a spherically concave socket $b^4$ closely adjacent said shaft B as shown in Fig. 6, and in which engages a spherically convex head $b^5$ secured on the end of a transmission shaft D by suitable antifriction bearings $d$ in this instance shown as a roller bearing. The opposite end of said transmission shaft extends through the side frame member A and through a casing $d'$ rigidly bolted thereto and at the outer end of which is a spherically concave socket formed by the end of said casing and a complemental nut $d^2$ threaded thereon and which together receive a spherically convex hub or head $d^3$ corresponding with the head $b^5$ and which also is secured on said shaft by roller bearings $d^4$. Said shaft projects through said head and secured thereon is a sprocket wheel comprising a hub $d^5$, which is flanged inwardly over the casing $d'$ and nut $d^2$ and as shown is provided with peripherally arranged sprocket teeth forming one or more integrally connected sprocket wheels $d^6$ and $d^7$. A corresponding transmission shaft $D'$ is similarly journaled in the opposite end of the housing and in the opposite frame member A.

Between each pair of driving friction wheels corresponding shafts D and D' are similarly journaled centrally thereof and feathered on each transmission shaft is a slidable transmission friction or driven element comprising a friction wheel $D^2$ or $D^3$ one on each side of the shaft B and which as shown are dished on their adjacent sides and on their outer sides are provided with elongated integral hubs $d^8$. Centrally disposed also between said driving friction members are transverse arch beams as shown three in number and indicated by E—E' and $E^2$. Said arch beams extend upwardly at each side approximately vertically above the side frame members or sills A to approximately the height of the driving friction wheel and then transversely of the frame as shown in Fig. 4 and each of the same as shown are channeled on the inner side. At the center of each beam the pin or bolt $b^2$ whereby the housing $B^2$ is centered upon the sleeve B' is engaged. Slidably engaged in the channels of said arch beams are upper and lower racks $e$ and $e'$ disposed on opposite sides of the beam and the inner ends of which are supported upon a transverse bar $e^2$ bolted beneath the beam. Secured rigidly at its upper end on the rack $e$ is a yoke $e^3$ which engages around a suitable fillet or collar $e^4$, of the hub $d^8$ of the transmitting friction wheel $D^2$ to shift the same towards the center of the driving friction wheel by the adjustment of said rack transversely of the frame. Correspondingly a rigid stirrup or yoke $e^5$, depends from the rack bar $e'$ and in a similar manner engages the hub $d^8$ of the transmitting friction wheel $D^3$ so that opposite movements of said rack bars correspondingly adjust said transmitting friction wheels radially on the driving friction wheels. Means are provided for shifting said racks to adjust said friction wheels, comprising as shown a shaft F journaled in suitable hangers $f$ integral with the arch beams on the under side thereof. Said shaft as shown is provided on each side of the hanger and between the same and the downwardly turned flanges of the arch beams with pinions $f'$ and $f^2$ which engage respectively on said rack bars for each set of transmitting friction wheels. Secured on said shaft F at its forward end is a sprocket wheel $f^3$, over which is trained a suitable sprocket chain $f^4$, which is also trained around the sprocket wheel $f^5$, on the end of a shaft F' journaled beneath the frame and at the other end of which is a beveled pinion $f^6$ which meshes with a beveled pinion $f^7$, on the tubular shaft $F^2$ through which the steering shaft $F^3$, extends as shown in Fig. 8. Each of the said shafts $F^2$ and $F^3$ is provided with a hand wheel or other suitable means for rotating the same, the one to steer the vehicle, the other to adjust the transmitting friction wheels inwardly or outwardly on the driving friction wheel to vary the speed to drive ahead or reverse. Means are also provided for bringing the transmitting friction wheel $D^2$ on one side of the driving shaft into engagement with the driving friction wheel in advance thereof and the transmitting friction wheel $D^3$ on the other side of the shaft into engagement with the driving friction wheel at the rear thereof, to propel the vehicle in one direction and to reverse the arrangement so that the transmitting friction wheel $D^2$ engages the rear driving friction wheel and the transmitting friction wheel $D^3$ engages the driving friction wheel in advance to drive in the opposite direction. For this purpose as shown the housing $B^2$ is provided at the upper end of the sleeve or column $b^3$, as shown in Figs. 4 and 5 with an arm or crank G as shown integral therewith and which is pivotally connected by a rod $g$ with a crank or arm $g'$ rigidly secured on a vertical shaft G' journaled in the end of the arch beam, as shown in Figs. 4 and 5. A corresponding crank arm $g^2$ at approximately a right angle with the crank arm $g'$ is secured thereon thereby affording a bell crank. Through the apertured end of said arm $g^2$ extends a thrust rod $G^2$. Said thrust rod as shown extends loosely through the apertured ends of said arms $g^2$ and is provided on each side of said arms with a collar or washer $g^4$ and between which and the arm engages a strong coiled spring $g^5$, of sufficient strength when compressed to shift the transmitting friction wheels into engagement with the driving friction wheels and to hold the same yieldingly in place. Any suitable means may be provided for shifting the thrust rod G², as for instance a lever either simple or compounded, as shown, however a pneumatic cylinder G³ is secured on the frame and in which a piston $q^6$ is secured on the end of said rod G² and as shown ports $q^7$—$q^8$ are provided one at each end of said cylinder and which are controlled as shown in Fig. 2, by a valve $q^9$, convenient of access to the operator and whereby compressed air may be admitted to either end of the cylinder to shift the transmitting friction wheels, either in the driving or reversing position as preferred. Should compressed air be employed for this purpose a suitable compressor (not shown) may be driven from the driving shaft B to afford a supply of compressed air to shift said transmitting friction wheels.

Each of the protruding ends of the shaft D is as shown provided with one or more sprocket wheels as shown in Fig. 1 about which are trained suitable sprocket chains which lead back to the rear wheel or axle of the vehicle and if preferred the outer ends of the shafts D' may also be provided with corresponding sprocket wheels thus affording a chain drive on each side of the wheel.

The operation is as follows: With the transmission mechanism constructed as described and connected with a suitable engine or motor it is obvious that when the motor is in operation, the driving shaft and driving friction wheels rotate continuously. When the transmitting friction wheels are out of contact with the driving friction wheels or in other words in neutral position, the vehicle remains at rest. Should it be desired however to move the vehicle the shaft F is rotated to shift the transmitting friction wheels inwardly to near the center of the driving friction wheels and the thrust rod G² is actuated to throw each transmission friction wheel on one side of the shaft into engagement with the driving friction wheels at the rear thereof and on the other side of the shaft into engagement with the driving friction wheels in advance of the same and this is obviously true for any number of transmitting friction wheels positioned between the pairs of driving friction wheels. Inasmuch as the thrust rod is connected by means of springs with the cranks for actuating said transmitting friction wheels, the frictional engagement of all the transmitting friction wheels upon the driving friction wheels is approximately equal, in consequence the frictional surface effectively engaged is very large and the vehicle is started with very slight slippage of the friction members. Having started the vehicle and attained sufficient momentum the shaft F is again rotated to shift the transmitting friction wheels radially outward on the driving friction wheels. The speed is thus obviously accelerated and the further outward the transmitting friction wheels are moved, at a given rate of motor shaft drive, the higher necessarily is the speed. Should it be desired to stop the vehicle, by reversing the air and shifting the thrust rod forwardly the engagement of the driven or transmitting friction wheels with the driving friction wheels is reversed, that is to say the transmitting friction wheels before engaging the rear driving friction wheels engage the driving friction wheels in advance while the opposite transmitting friction wheels engage the rear driving friction wheels. In this manner the transmission mechanism operates as a powerful brake applied directly to the rear wheels and owing to the adjustability of the transmitting friction wheels relatively of the driving friction wheels and the possibility of securing a very strong frictional contact, the vehicle can be stopped almost instantly.

In the construction shown in Fig. 10 in which five driving friction wheels C to C⁴ inclusive are secured on the driving shaft the construction is as before described in all respects except that the transmitting friction wheels are so arranged and operated that on one side of the driving shaft they pinch or oppositely engage alternate driving friction wheels and those on the other side of the shaft pinch or oppositely engage the remaining driving friction wheels. For this purpose the transmitting friction wheels are mounted on transmission shafts as before described and the actuating arms G for those engaging the same driving friction wheel are directed oppositely and the connecting rods $g$ therefor are engaged at their outer ends on a link $g^{10}$. Said link is connected at its middle with the arm $q^{11}$ of a bell crank the other arm $q^{12}$ of which is engaged on the thrust rod G² as before described. In this construction sprocket wheels are provided on alternate transmission shafts on the same side of the driving shaft and are connected by sprocket chains and each intermediate transmission shaft which of course revolves oppositely from those with the sprocket wheels, is provided with a gear wheel $g^{13}$ which intermeshes with a like gear wheel $g^{14}$ on each adjacent shaft so that the train of gears thus formed on each side of the vehicle transmits the power with very slight loss to the axle.

For adjusting the transmitting friction wheels radially of the driving friction wheels it is evident that any equivalent means may be employed and also it is evident that in lieu of compressed air any mechanical means, as for instance a lever, may be applied for adjusting the transmitting friction wheels to vary the frictional engagement with the driving friction wheels and furthermore from the construction described it is evident that any desired number of driving friction wheels may be employed and secured upon the same shaft and that by so doing not only is a positive drive assured but also that the area frictionally engaged as a whole is approximately equal to the area of the contact between one driving friction wheel and its transmitting friction wheel multiplied by the number of contacts between the driving and transmitting friction wheels. In other words inasmuch as the frictional area is very greatly increased it is evident that the amount of lost power through slippage must necessarily be inconsiderable and that with two or more driving friction wheels and a corresponding number of transmitting friction wheels any desired frictional effect can be secured at will.

Obviously details of construction may be varied and we therefore do not purpose limiting this application for patent otherwise than necessitated by the prior art.

We claim as our invention:

1. In a frictional transmission mechanism the combination with a driving shaft of two or more driving friction members engaged thereon, transmitting friction members journaled between said driving friction members and adapted for engagement therewith and a ball and socket joint connecting said transmitting friction members with the drive shaft.

2. In a friction transmission mechanism the combination with a driving shaft of two or more driving friction members engaged thereon and transmitting friction members journaled between said driving friction members and pivotally connected with the drive shaft and adapted for engagement with either a front or a rear driving friction member and shifting mechanism for adjusting said transmitting friction members radially of the driving friction members.

3. In a transmission mechanism the combination with a driving shaft and three or more driving friction wheels thereon adapted to rotate continuously of transmitting friction wheels journaled between the same on each side of the center thereof, a shaft for each transmitting friction wheel, means affording a ball and socket joint at each end thereof, anti-friction bearings for said shaft, adjusting mechanisms whereby the transmitting friction wheels on one side of the driving shaft can be adjusted to engage the adjacent front driving friction wheels and the transmitting friction wheels on the opposite side to engage the adjacent rear driving friction wheels or the reverse and means adjusting said transmitting friction wheels radially of the driving friction wheels.

4. In a transmission mechanism of the class described, a driving shaft and a plurality of driving friction wheels rigidly secured thereon, transmitting friction wheels adjusted between said driving friction wheels, a shaft for each transmitting friction wheel, sprocket wheels thereon, ball and socket joints on the ends of said shafts and means for adjusting the inner ends of said shafts oppositely at the same time.

5. In a machine of the class described the combination with a driving shaft of three or more driving friction wheels rigidly secured thereon transmitting friction wheels journaled transversely of the same and adapted for engagement each with the front or the rear of the driving friction wheels, means adjusting said transmission friction wheels to engagement with either driving friction wheel and embracing a sleeve on the driving shaft, a housing pivotally engaged thereon, a crank arm secured thereon, a bell crank engaged thereto and a thrust rod operating said bell crank.

6. In a machine of the class described a driving shaft, driving friction members thereon arranged to afford pairs of friction faces, a pair of transmitting friction members arranged between each pair of driving friction members, shafts therefor extending transversely of and on each side of the driving shaft, anti-friction adjustable bearings for each shaft and means acting to simultaneously adjust all the transmitting friction members to engage in pairs oppositely on the driving friction members.

7. In a device of the class described the combination with a driving shaft of a plurality of driving friction members engaged thereon and affording pairs of friction faces, a pair of transmitting friction members between each pair of driving friction members, shafts for said transmitting friction members journaled transversely of the driving shaft by means affording shiftable bearing and means for actuating the same to bring corresponding members of adjacent pairs of transmission friction members into pinching engagement with the friction faces of the intermediate driving friction members.

8. In a device of the class described the combination with a driving shaft of a plurality of driving friction wheels rigidly engaged thereon, a housing pivoted on said shaft between said friction wheels, transmission shafts journaled therein, a transmission friction wheel on each transmission shaft, means for shifting said transmission friction wheels into and out of engagement with said driving friction wheels and means for moving said transmission friction wheels radially of the driving friction wheels.

9. In a device of the class described the combination with a drive shaft of a plurality of driving friction wheels rigidly engaged thereon, a housing pivoted on the drive shaft between each two adjacent driving wheels, transmission shafts between said driving wheels, ball and socket connections between the transmission shafts and driving and transmission friction wheels on said transmission shafts.

10. In a device of the class described the combination with a frame of a drive shaft journaled therein, a plurality of driving friction wheels rigidly engaged thereon, transmission shafts between said driving friction wheels, ball and socket joints connecting said transmission shafts with the driving shaft and frame, transmission friction wheels adjustably engaged on said transmission shafts and means for adjusting the transmission friction wheels radially of the driving friction wheels.

11. In a device of the class described the combination with a frame of a driving shaft journaled therein, a plurality of driving friction wheels rigidly engaged thereon, housings pivoted on said shaft alternately with said driving friction wheels, casings rigidly engaged on the frame, transmission shafts journaled therein and in said housings, a ball and socket joint at each end of said transmission shafts, transmission friction wheels on said transmission shafts and means for simultaneously adjusting said housings to throw the transmission friction wheels into and out of engagement with the driving friction wheels.

12. In a device of the class described the combination with a frame of a driving shaft journaled therein, a plurality of driving friction wheels rigidly engaged on said shaft, a housing pivoted on said shaft between each two adjacent friction wheels, casings carried on the frame, means affording ball and socket joints in said housings and casings, transmission shafts journaled therein, transmission friction wheels on said shafts, means for shifting said transmission wheels radially of the driving wheels and means for simultaneously turning said housings on their pivots and throwing the transmission friction wheels into and out of engagement with the driving friction wheels.

13. In a friction transmission device the combination with a constantly driven shaft of driving friction members rigidly secured thereon, transmission shafts between adjacent driving friction members having pivotal connection at their inner ends with the driving shaft, a friction member on each transmission shaft adapted to contact the adjacent driving friction members and a joint for each outer end of each transmission shaft permitting the inner end thereof to swing freely in effecting the adjustment.

14. In combination with a suitable frame, a shaft journaled thereto, driving friction members secured on said shaft, transmission shafts extending transversely of the driving shaft, a friction member on each, a universal joint for the inner end of each transmission shaft, and a joint for the outer end of each transmission shaft comprising a casing rigidly secured to the frame, a spherical hub therein through which the outer end of the shaft extends, friction rollers in said hub around the shaft and means securing the hub in place permitting free movement thereof.

15. In a device of the class described the combination with driving friction members of transmission shafts between adjacent driving friction members, a driven member on each transmission shaft adapted to contact either driving friction member, a ball and socket joint for the inner end of each transmission shaft, a casing, means rigidly secured to the casing affording together therewith a rounded seat, a hub adjustable on said seat and adapted to receive the outer end of the transmission shaft therethrough and friction rollers between the shaft and hub.

16. In a transmission mechanism the combination with the driving shaft of transmission shafts on opposite sides thereof, coacting friction members on said shafts and a universal joint for the ends of said transmission shafts comprising a casing or housing affording a rounded seat, a complemental head therein, and anti-friction rollers in the head around the shaft said bearing affording movement in any direction.

17. In a device of the class described the combination with a drive shaft of transmission shafts extending transversely thereof, coacting friction members on said shafts, an oscillating housing on the drive shaft, universal roller bearings therein, one on each side of the drive shaft in which the inner end of the respective transmission shaft is journaled and a universal roller bearing for the opposite end of each transmission shaft.

18. In a device of the class described the combination with a driving shaft of transmission shafts pivotally supported at their inner ends therefrom, coacting friction members on said shafts, means for shifting the same into operative relation, a universal bearing for each end of said transmission shafts permitting the inner ends of said shafts being swung in throwing the friction members in contacting engagement.

19. In a device of the class described the combination with a driving shaft of transmission shafts, coacting friction members rotatable with the respective shafts, a non-rotatable sleeve journaled on the driving shaft providing an oil cup at each end, a housing pivoted to the sleeve, anti-friction bearings therein for the inner ends of the transmission shafts, an anti-friction universal bearing for the outer ends of the transmission shaft, a hub secured on the transmission shafts flanged upwardly over the bearing for the outer end of the shaft and sprocket teeth on said hub.

20. In a device of the class described a frame, a driving shaft, a transmission shaft, friction members on said shafts, means adapted to actuate the transmission shafts to throw the friction members thereon into contact with the friction members on the driven shaft, a casing rigidly secured to the frame, a nut threaded thereto affording together with the casing a rounded seat, a spherical head in said seat, through which the transmission shaft projects, rollers in said head around the shaft, means securing the same in place, a hub secured on the end of the shaft and sprocket wheels rigidly connected thereto and rotatable with the shaft.

21. In gearing of the character described, the combination with a shaft and a plurality of friction members thereon provided with a plurality of sets of friction faces, of transmission shafts, a plurality of sets of adjustable friction wheels thereon, one of said sets coöperating with each set of friction faces, a sleeve on the first named shaft, a housing, means pivoting the same to the sleeve, ball and socket joints in said housing for the inner ends of the transmission shafts and a ball and socket joint for each transmission shaft at its opposite end.

22. In gearing of the character described, the combination with a shaft, of a plurality of friction members thereon provided with a plurality of sets of friction faces, a plurality of transmission shafts between each set of faces, a friction wheel on each shaft adapted to contact with each face of a set, a single actuating device having connections with the various friction wheels for effecting their simultaneous adjustment and a universal roller bearing for each end of the transmission shaft.

23. In gearing of the character described, the combination with a main driving shaft, of a plurality of friction disks mounted thereon and having a plurality of independent sets of opposing friction faces, a transmission shaft extending between each set of faces, a friction wheel thereon and movable into engagement with either face of the set, actuating means connected to the various friction wheels for effecting their simultaneous movements, a tapered casing through which the outer end of the transmission shaft extends, a universal friction bearing in the casing for said shaft and a hub on the outer end of the shaft having a portion covering the bearing and sprocket wheels rigidly secured to the hub.

24. In gearing of the character described the combination with a shaft, of a plurality of friction members mounted thereon and having a plurality of independent sets of opposing friction faces, a laterally movable countershaft located between each set of faces, a friction wheel mounted on each shaft and movable therewith into engagement with either face of the set, a housing between the shaft for effecting their simultaneous lateral movement, means automatically actuating the housing and a ball and socket joint at each end of the counter shaft.

25. In gearing of the character described, the combination with a shaft, of a plurality of friction members mounted thereon and having a plurality of sets of opposing friction faces, a transmission shaft extending transversely of the aforesaid shaft, a friction wheel thereon coacting with the faces of each set and movable toward and from the axis of the shaft, means for effecting the simultaneous movements toward and from the shaft of the wheels coacting with the different sets of friction faces, means pivotally connecting the inner end of the transmission shaft with the other shaft and a ball and socket bearing for each end of the transmission shaft.

26. In gearing of the character described the combination with a shaft, of a plurality of friction members mounted thereon and having a plurality of separate sets of opposing friction faces, a transmission shaft located between each set, a roller bearing for each end of said transmission shaft, a friction wheel feathered on each shaft, said wheel coacting with the faces of the set and movable on the shaft toward and from the axis of the first mentioned shaft, means connected to the wheels of the different sets for effecting their simultaneous movements toward and from said axis and a universal joint for each end of the transmission shaft.

27. In a device of the class described the combination with a driving shaft of inwardly facing driving friction members thereon, a casing supported on the driving shaft, transmission shafts each having its inner end engaged in the casing, a universal joint at each end thereof, a driven friction member on each transmission shaft adapted one to contact with each driving friction member and means rocking the casing to throw said friction members into contacting engagement.

28. In a device of the class described the combination with a frame of a driving shaft journaled thereon inwardly facing driving friction members engaged thereon, transmission shafts having their inner ends between said driving friction members, a driven friction member on each transmission shaft, a casing journaled between said driving friction members, and in which the inner ends of the transmission shafts are journaled, means oscillating said casing to throw the driven friction members to contact either driving friction member and manually operated mechanism for forcing said driven 29. In a transmission mechanism the combination with a frame of a driving shaft journaled therein, driving friction members on said shaft, transmission shafts journaled transversely of said driving shaft, a friction member on each transmission shaft, a casing supporting the inner ends of each transmission shaft, a ball and socket joint for each end of each shaft, and means adapted to swing the casing to throw the ends of said transmission shaft oppositely to bring the driven and driving friction members in contact.

30. In a device of the class described the combination with a frame of a driving shaft carried thereby, driving friction members engaged on said shaft, a casing provided on said shaft, transmission shafts engaged at their inner ends in said casing and to the frame, a universal joint for each end of said transmission shafts, a driven friction member on each transmission shaft, an arm engaged to said casing and a lever connected to said arm to move the shafts oppositely to contact the driven with the driving friction members.

31. In a device of the class described the combination with a frame of a driving shaft carried thereby, a sleeve pivotally engaged to the shaft, a casing carried by said sleeve, a universal joint in each end of the casing, transmission shafts journaled at their inner ends in said joints and at their opposite ends journaled to the frame, a downwardly extending arm engaged to the casing, friction members engaged on said driving and transmission shafts normally out of contact and means connected to said arm adapted when actuated to oscillate the casing to throw said friction members on the transmission shafts into contact with the friction members in the driving shaft.

32. In a transmission mechanism the combination with a frame of a shaft journaled thereto, transmission shafts, friction members on the shafts, a ball and socket joint for each end of each transmission shaft and sprocket wheels on the outer ends of the transmission shafts extending peripherally around the ball and socket joints at approximately the center thereof.

33. In a transmission device the combination with a drive shaft of friction members thereon, transmission shafts extending transversely thereof, friction members thereon, mechanism for shifting the transmission shafts to adjust the friction members into contact, a ball and socket joint at each end of the transmission shafts and sprocket wheels concentric with the ball and socket joints at one end of the transmission shaft and rotatable with said shafts.

34. In a device of the class described the combination with a drive shaft of transmission shafts, friction members on said shafts, means for moving the transmission shafts to adjust the friction members into and out of operative relation, universal anti-friction joints on the ends of the transmission shafts and sprocket wheels rigidly connected with the transmission shaft and position with respect to the universal joints to necessitate minimum movement when the shafts are adjusted.

35. In a device of the class described the combination with a main shaft of transmission shafts, friction members on said shafts, means for oscillating the transmission shafts to adjust the friction members into contacting engagement, joints for the ends of the transmission shafts permitting any adjustment thereof and sprocket wheels rotatable with the transmission shafts having their center of gravity approximately at the center of one of the joints for each transmission shaft.

36. In a transmission device a main shaft, transmission shafts, ball and socket joints at the ends thereof having friction rollers, members around which the transmission element between the transmission shafts and axle are trained rotatable with the transmission shafts and surrounding the periphery of the ball and socket joints at approximately the center thereof, members on the shafts and means for shifting the members into operative relation.

In testimony whereof we have hereunto subscribed our names in the presence of two subscribing witnesses.

WILLIAM O. WORTH.
JOHN D. WORTH.

Witnesses:
W. W. WITHENBURY,
WM. C. SMITH.